United States Patent
Angerbauer et al.

(10) Patent No.: US 9,543,550 B2
(45) Date of Patent: Jan. 10, 2017

(54) BATTERY CELL MODULE, BATTERY, AND MOTOR VEHICLE

(75) Inventors: Ralf Angerbauer, Möglingen (DE); Conrad Bubeck, Esslingen (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 743 days.

(21) Appl. No.: 13/810,368

(22) PCT Filed: May 17, 2011

(86) PCT No.: PCT/EP2011/057915
§ 371 (c)(1),
(2), (4) Date: Mar. 29, 2013

(87) PCT Pub. No.: WO2012/007205
PCT Pub. Date: Jan. 19, 2012

(65) Prior Publication Data
US 2013/0207456 A1 Aug. 15, 2013

(30) Foreign Application Priority Data
Jul. 16, 2010 (DE) .......... 10 2010 031 462

(51) Int. Cl.
*H01M 6/42* (2006.01)
*H01M 2/00* (2006.01)
(Continued)

(52) U.S. Cl.
CPC ............ *H01M 2/0237* (2013.01); *B60L 11/18* (2013.01); *H01M 2/1077* (2013.01);
(Continued)

(58) Field of Classification Search
CPC .......... H01M 2/1027; H01M 2/1033; H01M 2/1072; H01M 2/1077; H01M 2/0237; H01M 2/217; H01M 10/0525; H01M 10/0413; H01M 10/0468; H01M 6/46; Y02E 60/122; Y02T 10/7011; B60K 2001/005; B60L 11/18
(Continued)

(56) References Cited

U.S. PATENT DOCUMENTS

| | | | |
|---|---|---|---|
| 1,823,066 A | 9/1931 | Shapiro | |
| 6,958,200 B2 * | 10/2005 | Kato | ............ H01M 2/02 429/163 |

(Continued)

FOREIGN PATENT DOCUMENTS

| | | |
|---|---|---|
| CN | 1606182 A | 4/2005 |
| DE | 1 158 137 | 11/1963 |

(Continued)

OTHER PUBLICATIONS

International Search Report corresponding to PCT Application No. PCT/EP2011/057915, mailed Sep. 5, 2011 (German and English language document) (7 pages).

*Primary Examiner* — Patrick Ryan
*Assistant Examiner* — Julian Anthony
(74) *Attorney, Agent, or Firm* — Maginot, Moore & Beck LLP

(57) ABSTRACT

A battery cell module includes a plurality of battery cells, in particular lithium-ion battery cells which are arranged in a packet and each of which has a substantially prismatic cell housing. Each cell housing has the three dimensions: housing height, housing width, and housing depth. Two of the dimensions are carried out in a substantially identical manner in all the battery cells of the battery cell module, and the third dimension is carried out differently in at least two battery cells of the battery cell module. A battery includes said battery cell module and a motor vehicle includes said battery.

9 Claims, 2 Drawing Sheets

(51) Int. Cl.
*H01M 2/02* (2006.01)
*H01M 2/10* (2006.01)
*H01M 10/0525* (2010.01)
*B60L 11/18* (2006.01)
*B60K 1/00* (2006.01)

(52) U.S. Cl.
CPC ... *H01M 10/0525* (2013.01); *B60K 2001/005* (2013.01); *H01M 2/0217* (2013.01); *Y02E 60/122* (2013.01); *Y02P 70/54* (2015.11); *Y02T 10/7011* (2013.01)

(58) Field of Classification Search
USPC ............... 429/120, 149, 156, 99; 307/9.1
See application file for complete search history.

(56) References Cited

U.S. PATENT DOCUMENTS

| | | |
|---|---|---|
| 2007/0051663 A1 | 3/2007 | Foreman et al. |
| 2008/0070110 A1 | 3/2008 | Olafsson et al. |
| 2011/0003187 A1* | 1/2011 | Graaf et al. ............ 429/120 |
| 2012/0015223 A1* | 1/2012 | Bhardwaj et al. ............ 429/94 |

FOREIGN PATENT DOCUMENTS

| | | |
|---|---|---|
| DE | 690 22 892 T2 | 4/1996 |
| DE | 10 2007 052 375 A1 | 5/2009 |
| EP | 1 523 058 A1 | 4/2005 |
| EP | 1 770 802 A1 | 4/2007 |
| JP | 11-3690 A | 1/1999 |
| JP | 2000-285953 A | 10/2000 |
| JP | 2005-116438 A | 4/2005 |
| JP | 2009-26703 A | 2/2009 |
| WO | 2009/074421 A1 | 6/2009 |

\* cited by examiner

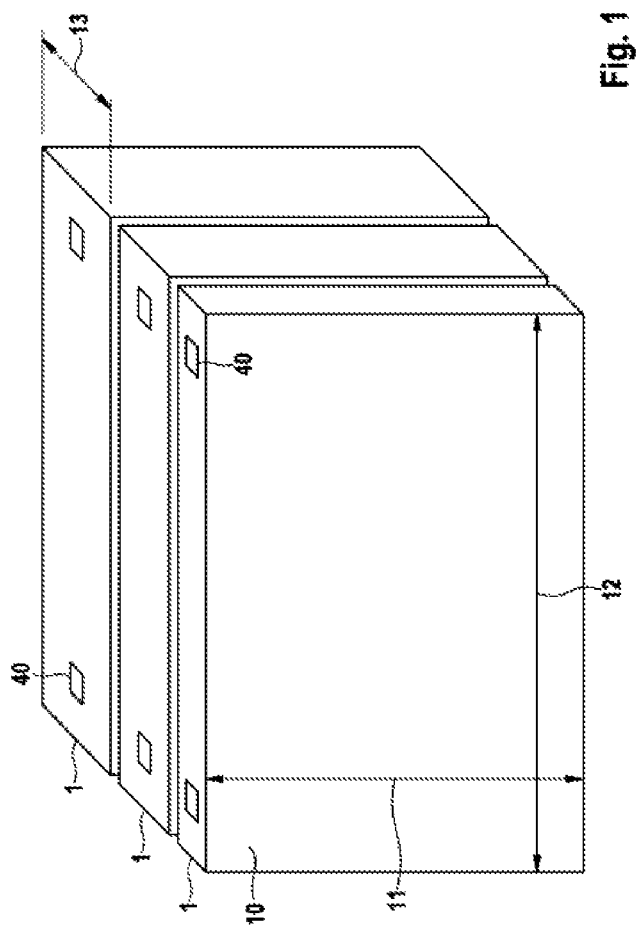

BATTERY CELL MODULE, BATTERY, AND MOTOR VEHICLE

This application is a 35 U.S.C. §371 National Stage Application of PCT/EP2011/057915, filed on May 17, 2011, which claims the benefit of priority to Serial No. DE 10 2010 031 462.5, filed on Jul. 16, 2010 in Germany, the disclosures of which are incorporated herein by reference in their entirety.

The present disclosure relates to a battery cell module which comprises a multiplicity of battery cells which are arranged in a pack and which have in each case a substantially prismatic cell housing, wherein a respective cell housing has the three dimensions housing height, housing width and housing depth.

The present disclosure also relates to a battery which comprises at least one battery cell module according to the disclosure.

The present disclosure is supplemented by a motor vehicle which has at least one battery according to the disclosure.

BACKGROUND

A battery which comprises one or more galvanic battery cells serves as an electrochemical energy store and energy converter. During the discharging of the battery or of the respective battery cell, chemical energy stored in the battery is converted into electrical energy by way of an electrochemical redox reaction. Said electrical energy can be demanded by a user according to requirements.

In particular in hybrid and electric vehicles, in so-called battery packs, use is made of lithium-ion batteries or nickel-metal hydride batteries composed of a large number of electrochemical cells connected in series. It is conventionally the case here that a battery management system including a battery state detection means serves for safety monitoring and for ensuring as long a service life as possible.

In the case of lithium-ion storage technology, a multiplicity of individual battery cells are connected together to form an overall battery. Here, each individual cell has a housing for encasing the active battery cell components and the electrolyte. Only the electrical terminals or poles of the battery cell project out of the battery cell housing.

DE 690 22 892 T2 discloses a modular battery installation system which is composed of a plurality of individual module units. Such individual module units may be battery cells. These basic structural units can, on the basis of the modular principle, form a battery assembly of virtually any desired size.

DE 10 2007 052 375 A1 describes an energy store with more effective cooling and a method for the inexpensive production of said energy store, which method permits the production of an energy store to meet different customer demands. It is also the case in the embodiment described in DE 10 2007 052 375 A1 that a compact and inexpensive modular design is attained which can be used within the context of a modular system. It is possible here, too, for virtually any desired number of cells to be connected together to form modules.

Overall, therefore, it is known that battery cells designed for the same applications or of similar type can be combined to form modules. Here, however, no allowance is made for different types of battery cells or battery cells for different applications. For example, the batteries used in different types of electric vehicles are relatively different in terms of their structural configurations and their external dimensions. This results firstly from different power requirements and secondly from different available installation space conditions or arrangement positions. Furthermore, the different battery cells or batteries have terminals which differ from one another, such as for example different thread sizes. Said differences between the batteries or battery cells makes the transport, storage and also handling and mounting thereof relatively cumbersome. Furthermore, supply systems, positioning systems, fixing systems, maintenance systems, temperature control systems and handling systems must be of relatively complex design in order to allow them to be used for the different battery cell types or battery types.

SUMMARY

A battery cell module is provided which comprises a multiplicity of battery cells, in particular lithium-ion battery cells, which are arranged in a pack and which have in each case a substantially prismatic cell housing, wherein a respective cell housing has the three dimensions housing height, housing width and housing depth. According to the disclosure, two of the dimensions are substantially identical for all of the battery cells of the battery cell module, and the third dimension differs for at least two battery cells of the battery cell module.

That is to say that the size of the third dimension may vary from battery cell to battery cell, wherein the sizes of the first and second dimensions are identical for every battery cell.

Here, the disclosure is not restricted to lithium-ion battery cells; other battery cells, for example also nickel-metal hydride battery cells, may alternatively be configured and arranged according to the disclosure.

Considering a prismatic battery cell to be placed on a base surface, the housing height of said battery cell is the distance from the base surface to a top surface which forms a termination of the battery cell housing at the uppermost edge. The housing width corresponds to the length of an edge of the base surface and runs perpendicular to the housing height. The housing depth runs perpendicular to the housing height and to the housing width and, in the case of a prismatic battery cell with a rectangular base surface, runs correspondingly to the length of a second edge of the base surface which runs perpendicular to the first edge of the base surface.

In the case of step formations in the housing, for example in the housing height, a corresponding housing has portions of different height. According to the disclosure, identical height of the battery cells of the module means in this case that all of the battery cells of the module have the same step formation in terms of height, preferably also with identical width of the step formation.

According to the disclosure, taking as a starting point normal battery cells which are or can be placed, adjacent to one another, on their base surfaces and which have in each case one prismatic cell housing with a preferably rectangular base surface, said base surfaces are of different size for at least two of the battery cells if, as the third variable, the housing depth varies from battery cell to battery cell. By contrast, front and rear side surfaces, which preferably stand perpendicular to the base surface, are of equal size for each battery cell. It is preferable for the three stated dimensions housing height, housing width and housing depth to be the volume-defining dimensions of the battery cell, that is to say the battery cell has no volume elements other than the prismatic cell housing itself. The battery cells are arranged in a pack, wherein in each case one or more intermediate layers may if appropriate be provided between the battery cells. Said intermediate layers are however formed so as to be relatively thin in relation to the depths of the battery cells, such that the battery cells arranged in the pack form a compact module.

The advantage of the disclosure lies in particular in the fact that, owing to the standardization of at least two geometric dimensions of the battery cells, it is made possible to standardize geometric parameters of the surroundings of the battery cell module during its use, storage, handling, transport and mounting. For example, if, for the same housing height and housing width, only the depth of individual battery cells of the battery cell module is varied, it is thus the case that two geometric dimensions of the battery cell module as a whole, that is to say the module width and the module height, are also fixedly predefined. Variations of the battery cell module can exist only in its length owing to different depths of individual battery cells. In one particular refinement, it is possible, even despite different depths of individual battery cells which are used, for the modules produced from said battery cells to have equal lengths. As a result of the reliable adherence to equal module widths and heights, it is possible for transport systems, storage systems, supply systems, positioning systems, fixing systems, maintenance systems, temperature control systems and handling systems to be set u uniformly and, if appropriate, to be designed to be variable only in terms of depth or length. In this way, it is possible for transport systems, storage systems, supply systems and handling systems to be of uniform and/or simpler design. The processes to be performed by said systems are easier to compute. Temperature control or monitoring systems can be designed with lower outlay in terms of parts. The standardization of dimensions furthermore provides constraints for further battery development, which have the effect of accelerating the development process of battery cells and batteries.

It is preferable for the identical dimensions to be the housing height and the housing width and for the dimension which distinguishes at least two battery cells to be the housing depth. The housing depth is thus definitive of the volume difference between the respective battery cells. The greater the desired capacity of the cell, the greater the battery cell depth should be.

The battery cell module according to the disclosure preferably comprises a pair of clamping plates of substantially equal size, wherein in each case one clamping plate bears against an outer housing wall of an outer battery cell of the battery cell module and exerts a force on said battery cell in the direction of the in each case other clamping plate. The clamping force or clamping forces may be realized by means of suitable clamping devices such as clamping bolts or belts, if appropriate with the aid of spring elements. The advantage of said embodiment of the disclosure lies in the fact that identical clamping plates can be used despite the use of different battery cells.

In a further advantageous embodiment, it is provided that the battery cell module according to the disclosure has at least one cooling plate which bears against an outer surface formed by the pack of battery cells. Said common outer surface is formed by the respective outer surfaces of the individual battery cells, for example on the underside of the pack of battery cells, such that a plurality, and preferably all, of the undersides of the battery cells make contact with the cooling plate. Owing to the identical dimension, for example the identical width of the battery cells, it is preferably possible to use cooling plates which have in each case a width matched to said standard width. Only the lengths of the cooling plates may vary depending on the length of the respective battery cell module. It is clear that, to produce such standardized cooling plates, less production and assembly outlay is required and simpler or fewer manufacturing means can be used.

Furthermore, terminals of the battery cells of a respective battery cell module may be of substantially identical configuration in terms of their geometric dimensions. Said terminals preferably comprise identical shaped elements, such as for example connection means in the form of threads. It may for example be provided that all of the terminals are equipped with an M8 thread. Here, the expression "terminal" is to be understood to mean the battery cell poles which project out of the battery cell housing and which are connected in electrically conductive fashion to the coils in the interior of the battery cell. The advantage of this embodiment of the disclosure lies in the reduction of the number of different types of cell connectors and in simplified mounting of said cell connectors.

The disclosure also relates to a battery, in particular a lithium-ion battery, which comprises at least one battery cell module according to the disclosure. Depending on the demanded power, a battery may have a multiplicity of such battery cell modules according to the disclosure.

Here, a battery of said type may be designed such that a first battery cell module comprises at least one battery cell for which the third dimension is larger or smaller than the third dimension of at least one battery cell of a second battery cell module, wherein the cooling plates assigned to the battery cell modules have substantially the same dimensions and the same geometric shape. In one design variant, all of the battery cells of a module have the same third dimension, that is to say the size of said dimension is the same for all of the battery cells of the module. Here, different numbers of battery cells may be connected to one another to form modules such that the entirety of the battery cells of one module can be arranged on a cooling plate with substantially the same dimensions as the cooling plate assigned to another module. The advantage of this configuration lies in the fact that, despite the different third dimension, for example despite different depths of the individual battery cells in the individual modules and different numbers of battery cells, identical cooling plates can be used.

In one particular embodiment of the battery according to the disclosure, it is provided that the battery cell modules are arranged stacked one above the other. Owing to identical base surface dimensions, said battery cell modules are particularly well suited to being stacked, in particular if the battery cells have been combined to form modules in such a way that the modules have identical lengths despite different depths of the individual battery cells. In the case of possibly different lengths of the modules, it is possible to realize offset stacking, which however leads to improved strength of the battery cell stack. That is to say that, according to the disclosure, the battery cells can likewise be arranged in a modular system and one above the other to form a battery.

The disclosure also comprises a motor vehicle and in particular a motor vehicle which can be driven by electric motor, which motor vehicle has at least one battery with the battery cell module according to the disclosure, wherein the battery is connected to a drive system of the motor vehicle.

BRIEF DESCRIPTION OF THE DRAWINGS

Exemplary embodiments of the disclosure will be explained in more detail on the basis of the drawings and the following description. In the drawings:

FIG. 1 shows a battery cell module in a perspective view,

DETAILED DESCRIPTION

Figure 3:
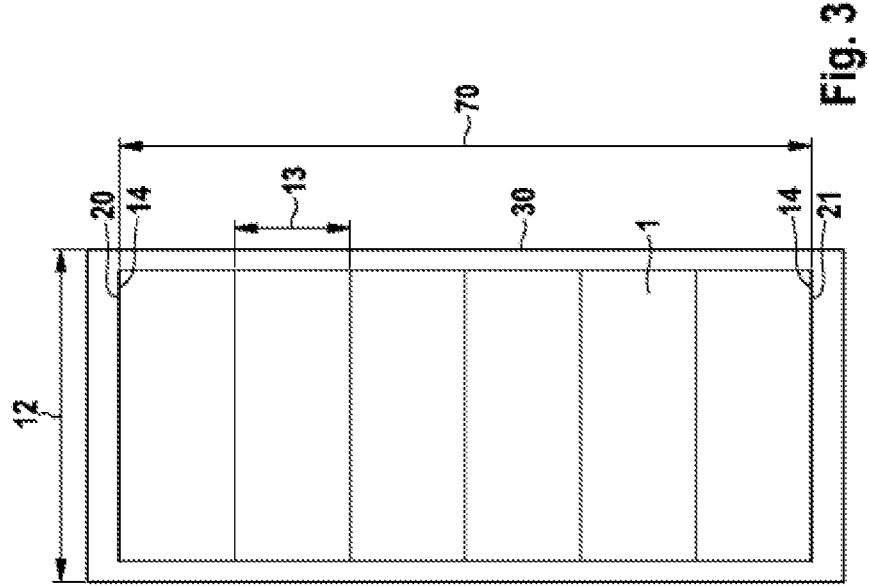
FIG. 3 shows a battery cell module in a view from above.

FIG. 1 shows the general construction of a battery cell module according to the disclosure. Said battery cell module is assembled from individual battery cells 1. Each battery cell 1 has a volume-defining cell housing 10. It can be clearly seen that the battery cells 1 have in each case an identical housing height 11 and housing width 12.

Each of the illustrated battery cells has a different housing depth 13. Each of the illustrated battery cells 1 thus has a different volume. Despite the use of battery cells 1 with different volumes and accordingly with different capacities, it is possible for the battery cells 1 to be arranged as illustrated in FIG. 1 such that they can for example be transported, stored or mounted together in a simple manner. On the top sides, the battery cells 1 each have terminals 40. Said terminals are preferably likewise of identical design with regard to their geometric dimensions and/or connection means, such that identical connectors can be used for connecting the battery cells to one another and for connecting to other batteries.

Figure 2:
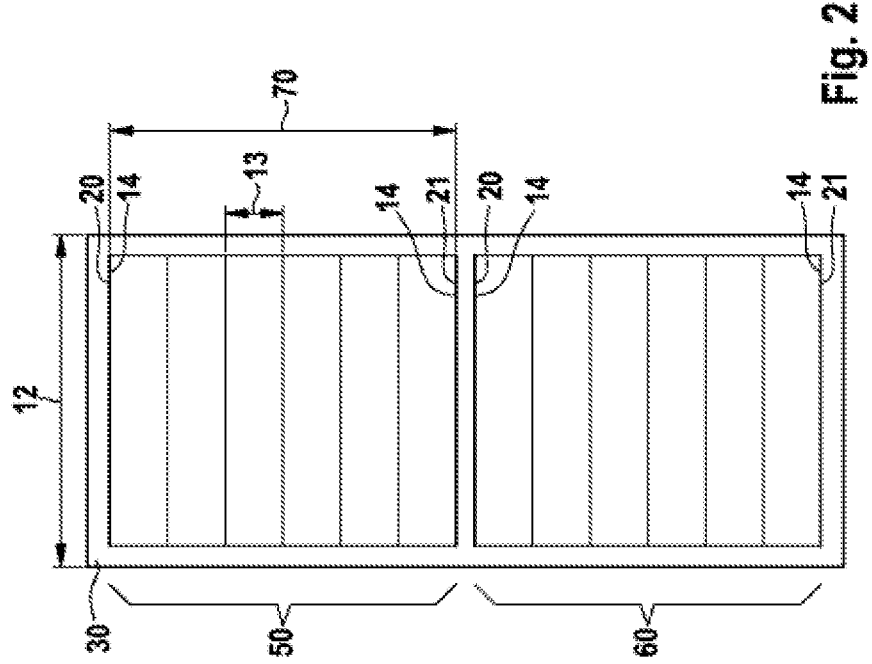
FIG. 2 shows two battery cell modules in a view from above.

The individual battery cells 1 which are combined to form packs may, as modules, be placed on and/or covered by cooling plates 30. As illustrated in FIG. 2, it is for example possible for a first battery cell module 50 and a second battery cell module 60 to be arranged on a cooling plate 30. According to FIG. 3, however, it is also possible for only one battery cell module to be arranged on a cooling plate 30 having the same geometric dimensions as the cooling plate according to FIG. 2. Owing to the smaller housing depth 13 of the battery cells 1 used in FIG. 2, twice as many battery cells can be arranged on the cooling plate 30 as can be arranged on the cooling plate 30 in FIG. 3.

The disclosure is however not restricted to the arrangement of two battery cell modules 50, 60 on a longer cooling plate 30; it would rather also be possible to arrange on said cooling plate 30 only one battery cell module as in FIG. 3, but with twice the number of battery cells 1.

The respective module length 70 is thus determined by the different depths 13 of the individual battery cells 1 and the number of battery cells 1 arranged in each module.

The battery cells illustrated in FIGS. 2 and 3 may, as illustrated in FIG. 1, have different housing depths 13, whereby further variations in module lengths 70 can be realized.

It is advantageous for a certain number of battery cells 1 in a battery cell module to be held together by means of a first clamping plate 20 and a second clamping plate 21. A respective clamping plate 20, 21 bears against the housing wall of in each case one outer battery cell 14 and is pulled or pushed in each case in the direction of the other clamping plate by suitable clamping means. Owing to the use of battery cells 1 with identical housing height 11 and identical housing width 12, it is likewise possible to use clamping plates of equal size, such that less outlay is required with regard to the production and mounting of the clamping plates.

The invention claimed is:

1. A battery cell module, comprising:
   a plurality of battery cells substantially forming a rectangular cuboid and each having a respective substantially prismatic cell housing, wherein:
   each respective cell housing has three dimensions: a housing height, a housing width and a housing depth,
   two dimensions of the three dimensions are substantially identical for all of the battery cells of the plurality of battery cells, and a third dimension of the three dimensions differs between at least two battery cells of the plurality of battery cells, and
   the plurality of battery cells are arranged adjacent to each other in a longitudinal direction of the battery cell module and the third dimension is parallel to the longitudinal direction.

2. The battery cell module as claimed in claim 1, wherein the two dimensions are the housing height and the housing width and the third dimension is the housing depth.

3. The battery cell module as claimed in claim 1, further comprising:
   a pair of clamping plates of substantially equal size, wherein each clamping plate of the pair of clamping plates is configured to bear against a housing wall of a respective outer battery cell of the plurality of battery cells and to exert a force on said respective outer battery cell in a direction toward the other clamping plate of the pair of clamping plates.

4. The battery cell module as claimed in claim 1, further comprising:
   at least one cooling plate configured to bear against an outer surface of each of the plurality of battery cells.

5. The battery cell module as claimed in claim 1, wherein:
   each battery cell of the plurality of battery cells has a respective one of a plurality of terminals, and
   each respective one of the plurality of terminals has a substantially identical configuration in terms of geometric dimensions to the other of the plurality of terminals.

6. A battery comprising:
   at least one battery cell module including:
   a plurality of battery cells each having a respective substantially prismatic cell housing, wherein:
   each respective cell housing has a first extent along a first axis, a second extent along a second axis, and a third extent along a third axis,
   each of the third extents are aligned on the third axis,
   each of the first axis, the second axis and the third axis is orthogonal to the other of the first, second and third axis,
   each of the first extents and the second extents are substantially identical, and the third extent of a first of the plurality of battery cells differs substantially from the third extent of a second of the plurality of battery cells, and
   the plurality of battery cells are arranged adjacent to each other in a longitudinal direction of the at least one battery cell module and the third dimension is parallel to the longitudinal direction.

7. The battery as claimed in claim 6, wherein:
   the at least one battery cell module is a plurality of battery cell modules including a first battery cell module and a second battery cell module,
   the first battery cell module includes at least one battery cell for which the third extent is larger or smaller than the third extent of at least one battery cell of the second battery cell module, and
   cooling plates assigned to said first and second battery cell modules have substantially identical dimensions and geometric shape.

8. The battery as claimed in claim 7, wherein:
each of the plurality of battery cells in the first battery cell module includes an upper surface which does not face any surface of the other of the plurality of battery cells in the first battery cell module;
each of the plurality of battery cells in the second battery cell module includes a lower surface which does not face any surface of the other of the plurality of battery cells in the second battery cell module; and
each of the upper surfaces of the plurality of battery cells in the first batter cell module is in opposition to at least a portion of a respective one of the lower surfaces of the plurality of battery cells in the second battery cell module.

9. A motor vehicle which can be driven by an electric motor, comprising:
at least one battery having at least one battery cell module including:
a plurality of battery cells substantially defining a rectangular cuboid and each having a respective substantially prismatic cell housing, wherein:
each respective cell housing has three dimensions: a housing height, a housing width and a housing depth,
two dimensions of the three dimensions are substantially identical for all of the battery cells of the plurality of battery cells, and a third dimension of the three dimensions differs for at least two battery cells of the plurality of battery cells,
the at least one battery is connected to a drive system of the motor vehicle, and
the plurality of battery cells are arranged adjacent to each other in a longitudinal direction of the at least one battery cell module and the third dimension is parallel to the longitudinal direction.

* * * * *

UNITED STATES PATENT AND TRADEMARK OFFICE
CERTIFICATE OF CORRECTION

PATENT NO. : 9,543,550 B2
APPLICATION NO. : 13/810368
DATED : January 10, 2017
INVENTOR(S) : Angerbauer et al.

It is certified that error appears in the above-identified patent and that said Letters Patent is hereby corrected as shown below:

In the Claims

Column 7, Lines 10-14, Claim 8 should read:

each of the upper surfaces of the plurality of battery cells
    in the first battery cell module is in opposition to at least
    a portion of a respective one of the lower surfaces of the
    plurality of battery cells in the second battery cell
    module.

Signed and Sealed this
Sixteenth Day of May, 2017

Michelle K. Lee
*Director of the United States Patent and Trademark Office*